UNITED STATES PATENT OFFICE

WERNER SCHMIDT AND PAUL HARTMUTH, OF FRANKFORT-ON-THE-MAIN-FECHEN-HEIM, GERMANY, ASSIGNORS TO WINTHROP CHEMICAL COMPANY, INC., OF NEW YORK, N. Y., A CORPORATION OF NEW YORK

ALKYLATED AMINO-ACRIDINIUM COMPOUNDS AND PROCESS OF MAKING THEM

No Drawing. Application filed February 8, 1930, Serial No. 427,054, and in Germany February 12, 1929.

The present invention relates to alkylated amino-acridinium-compounds and a process of making them. This process comprises mixing 3.6-diamino-acridine of the formula:

with an alkylating agent and heating the mixture to a temperature ranging from about 90° to about 120° C. An inorganic salt as, for example, common salt may be added to the mixture.

The alkylation of amino-acridine compounds is already described in U. S. Patent No. 1,005,176. According thereto, the alkylation is effected at higher temperatures (about 180° C.) and in the presence of nitrobenzene. In contradistinction to this much more complicated process, in our present process no solvents are needed; furthermore, the reaction takes place already at temperatures from about 90° to about 120° C. This fact represents an important technical advantage.

The products obtained by our present process are distinguished by a great bactericidal power and a good solubility in water. They are characterized by that not only the ring-nitrogen atom but also one of the primary amino groups are alkylated. The compounds thus formed may correspond according to this assumption to the following formula:

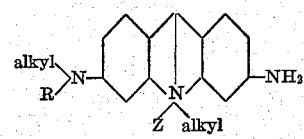

(wherein R means hydrogen or alkyl and Z means an acidic group).

Example 20.9 parts of 3.6-diamino-acridine are well mixed with 55.8 parts of the methyl ester of toluene sulfonic acid and the mass is heated to 95° C. for 12 hours. The brownish-yellow alkylation product thus obtained yields, when heated with hydrochloric acid, a compound which is soluble in water with an orange-red tint and dyes cotton mordanted with tannin orange shades fast to alkali. The latter compound represents in the solid state a chocolate-colored powder soluble in concentrated sulfuric acid to a yellow solution having a green fluorescence. This solution becomes orange-red with a light yellow fluorescence when diluted with water.

The orange-red aqueous solution of this compound turns to claret-red when mixed with hydrochloric acid and sodium nitrite. As 3.6-diamino-acridines containing two primary amino groups yield violet diazo compounds it is assumed that in the present case, besides the alkylation of the annular nitrogen atom, one of the two primary amino groups is entirely or partially alkylated.

In accordance with this assumption the present compound dyes cotton mordanted with tannin orange shades, whereas the acridinium compound obtained from 3.6-diacetoamino-acridine dyes yellow shades.

The reaction takes place according to the following probable equation:

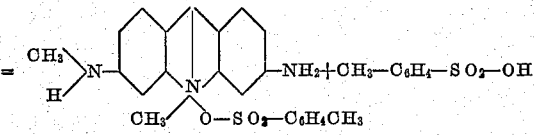

We claim:

1. The process which comprises mixing 3.6-diamino-acridine of the formula:

with the methylester of toluene sulfonic acid, and heating the mixture to about 95° C. for 12 hours.

2. The acridinium salts of the probable formula:

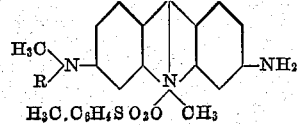

wherein R stands for hydrogen or methyl.
3. The process which comprises mixing 3.6-diamino-acridine of the formula:
with the methyl ester of toluene sulfonic acid and heating the mixture to a temperature from about 90° C. to about 120° C.
In testimony whereof, we affix our signatures.
WERNER SCHMIDT.
PAUL HARTMUTH.